United States Patent [19]

Wang

[11] Patent Number: 4,930,210

[45] Date of Patent: Jun. 5, 1990

[54] METHOD FOR ASSEMBLING AN ELECTRIC MOTOR ARMATURE

[75] Inventor: Patrick S. Wang, Repulse Bay, Hong Kong

[73] Assignee: Johnson Electric Industrial Manufactory Limited, Chaiwan, Hong Kong

[21] Appl. No.: 277,348

[22] Filed: Nov. 29, 1988

Related U.S. Application Data

[62] Division of Ser. No. 78,994, Jul. 29, 1987.

[30] Foreign Application Priority Data

Mar. 16, 1987 [GB] United Kingdom ............... 8706167
Apr. 13, 1987 [GB] United Kingdom ............... 8708781

[51] Int. Cl.$^5$ ..................... H01R 43/06; H02K 15/09
[52] U.S. Cl. ........................................ 29/597; 29/598; 310/42; 310/234
[58] Field of Search ................ 29/597, 598, 596; 310/42, 21, 234, 232

[56] References Cited

U.S. PATENT DOCUMENTS

| | | |
|---|---|---|
| 2,000,715 | 5/1935 | Penney ........................... 310/236 |
| 4,152,614 | 5/1979 | Noguchi et al. . |
| 4,439,255 | 3/1984 | Imai et al. ........................ 174/84 R |
| 4,584,498 | 4/1986 | Strobl ............................. 310/71 X |
| 4,713,013 | 12/1987 | Regnier et al. . |
| 4,757,602 | 9/1988 | Evenson ........................... 29/597 |

FOREIGN PATENT DOCUMENTS 2180412 3/1987 United Kingdom .

Primary Examiner—Carl E. Hall
Attorney, Agent, or Firm—Fleit, Jacobson, Cohn, Price, Holman & Stern

[57] ABSTRACT

An armature for an electric motor comprises a winding having connector portions and a plurality of combined commutator segments and terminals. The terminals each have at least one slot which straddles and grips a respective connector portion to electrically connect the connector portion to a commutator segment. A base supports the commutator segments and a separate terminal support has a plurality of housings locating the terminals. By making the base separate to the terminal support, the armature may be wound with only the terminal support in position, the base being added afterwards, thus giving more room during winding. In a preferred embodiment, the support is formed of thermoplastics material, e.g. thermosoftening nylon, so that it is able to flex during insertion of the terminals and the base is of a material which will withstand higher temperatures, e.g. thermosetting plastics material or anodized aluminium.

4 Claims, 3 Drawing Sheets

METHOD FOR ASSEMBLING AN ELECTRIC MOTOR ARMATURE

This is a divisional of application Ser. No. 078,994, filed July 29, 1987.

INTRODUCTION

The present invention relates to an armature for an electric motor.

BACKGROUND

In our British Patent No. 2128818B we describe a connection between the armature winding and a commutator segment which avoids the application of heat to effect the connection and which utilises the principle of insulation displacement in which a wire having an insulating cover is forced into a slot narrower than the wire diameter to form a clean metal to metal contact between the wire and a terminal integral with the commutator segment.

In the aforesaid Patent the commutator segments are mounted on a base which has a plurality of radially extending integral housings formed at one end for receiving the aforesaid terminals. When winding the armature wire into the housings the winding arm guiding the wire may foul the base as it passes around the housings.

SUMMARY OF THE INVENTION

In order to mitigate this drawback, the present invention provides an armature for an electric motor, comprising a winding having connector portions, a plurality of commutator segments each having an integral terminal provided with a slot which straddles and grips a respective connector portion, a commutator base for supporting said commutator segments and a separate terminal support having a plurality of housings in which the terminals are located.

In practice it has been found desirable with some commutator segment materials to make the known base with integral housings of a flexible plastics material, such as thermosoftening nylon, to allow the housings to flex during insertion of the terminals. However, it has been found that such a base is unable to withstand the temperatures met during the running of a motor and particularly at stall when the full stall current is passing through the interface between the brush gear and the commutator segments.

To overcome this drawback the terminal support may be formed of thermoplastics material and the commutator base of a material which will withstand higher temperatures than the thermoplastics material of the terminal support.

The commutator base and terminal support are thus made of different material, each compatible with the function which it has to perform.

Other preferred features and advantages of the invention are set forth in the following description and the accompanying claims.

In a preferred assembly sequence, the terminal support is mounted on an armature shaft against a lamination stack and the armature is then wound during which the connector portions are located in the housings of the terminal support. The comutator segments are pre-assembly onto the commutator base and this sub-assembly is then offered up to the wound armature by sliding the base along the armature shaft. As the terminals integral with the commutator segments enter respective housings slots straddle the wires to establish and maintain contact with respective connector portions.

BRIEF DESCRIPTION OF THE DRAWINGS

The invention will now be more particularly described, by way of example, with reference to the accompanying drawings, in which.

DESCRIPTION OF PREFERRED EMBODIMENT

Figure 1:
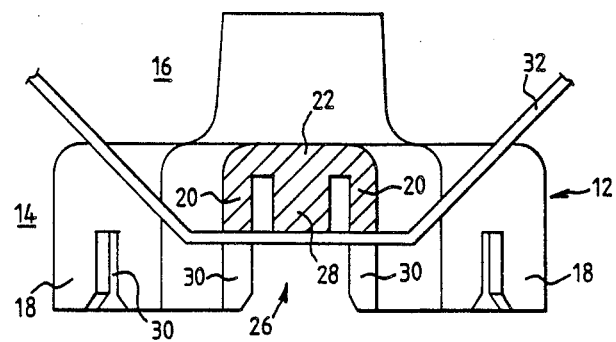
FIG. 1 shows in plan view a terminal support forming part of the armature and is partially sectioned to illustrate the configuration of one of the terminal housings.
Figure 5:
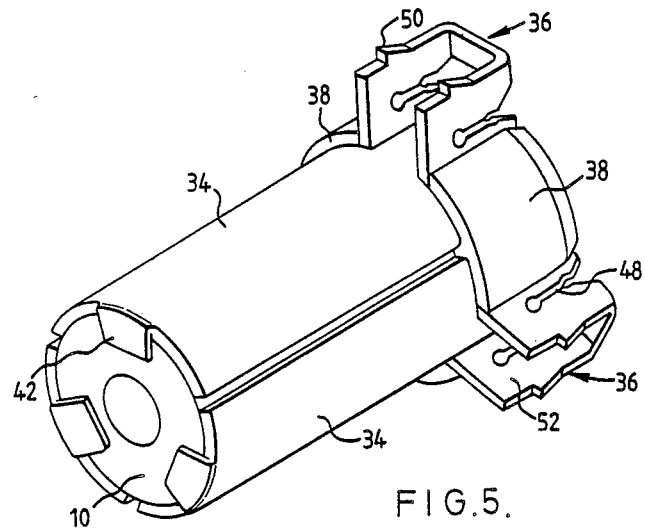
FIG. 5 is a perspective view of an assembled commutator including the base and commutator segments mounted thereon prior to being offered up to the terminal support.
Figure 6:
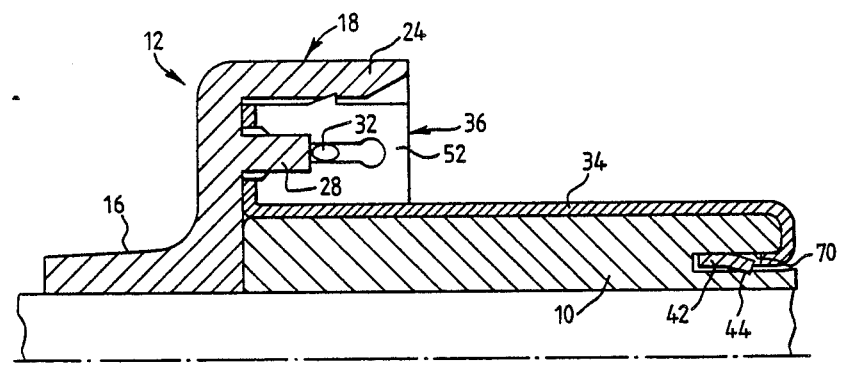
FIG. 6 is a vertical sectional view of the terminal support of FIG. 1 and of the assembled commutator of FIG. 5 with the assembled commutator connected to the support.

FIGS. 1 and 6 show a terminal support in the form of a body 12 of moulded thermoplastics material, e.g. thermosoftening nylon. The body 12 has two sections 14 and 16 and is mounted fast on the shaft (not shown) of an armature of an electric motor. The section 14 comprises three housings 18 and the section 16 acts as a spacer to space the section 14 of the body 12 from the base of the armature stack (not shown). The body 12 co-operates with a commutator base 10 (FIGS. 5 and 6) to support the commutator segments and the terminals integral therewith in a manner which will be described. The base 10 is of a material which will withstand a higher temperature than the body 12, e.g. it is of moulded thermosetting plastics material such as a phenolic resin, or of metal provided with an insulating layer of metal oxide, e.g. anodised aluminium, to avoid softening and distortion when current, particularly full stall current, is passing through the brush/commutator interface. The base 10 is essentially a hollow cylinder with three arcuate ears 38 at its rear end, the ears 38 being equally spaced around the circumference of the base 10 and being each a close fit in the section 14 to the body 12 between an adjacent pair of housings 18.

The three housings 18 of the body 12 are equally spaced around the circumference of the body 12. Each of the housings 18 is used ni effecting connection between a respective portion of the armature winding and one of the commutator segments.

One of the housings 18 is shown in section in FIG. 1. The housing has side walls 20, an end wall 22 and a cover 24. The end wall 22 is adjacent the spacer 16 and an opening 26 which faces away from the spacer 16 is provided by the walls 20, 22 and cover 24. The side walls are parallel with the longitudinal axis of the body 12.

A boss 28 projects centrally from the internal surface of the end wall 22 and extends within the housing 18 for approximately half the length of the side walls 20. The boss 28 extends parallel with the longitudinal axis of the body 12 and is only connected to the body 12 by the end wall 22. Each side wall 20 of the housing 18 has a slot 30 which extends parallel to the longitudinal axis of the body 12, from the commutator end of the housing 18 for a length which terminates at the level of the free end of the boss 28. A portion 32 of the armature winding is passed through the slots 30 of one of the housings 18 and the winding portion 32 rests on the end of the boss 28. The external surfaces of the side walls 20 are bevelled so as to facilitate entry of the winding portion 32 into the slots 30.

Figure 2:
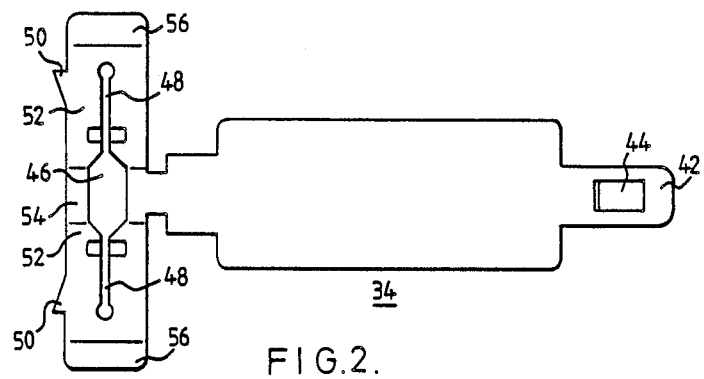
FIG. 2 is a plan view of a commutator segment and terminal in blank form.
Figure 3:
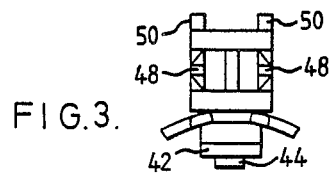
FIG. 3 is an end elevation of the commutator segment and terminal of FIG. 2 showing the operational configuration of the segment and terminal.

A combined commutator segment 34 and terminal 36 is illustrated in FIGS. 2 and 3. FIG. 2 shows the combination in the form of a blank and FIG. 3 is an end elevation of the combination when formed into its operational configuration. A lug 42 of reduced width is provided at the front end of the segment 34 and the lug 42 has a central struck-up tag 44.

At its rear end, the commutator segment 34 is connected to the terminal 36. The terminal 36 is rectangular with its minor axis coincident with the longitudinal axis of the commutator segment segment 34. The terminal 36 has a central cut out portion 46 which is symmetrical with respect to both the major and minor axis of the terminal 36. The cut out 46 reduces from its largest width at the centre of the terminal to two key hole shaped portions 48 which terminate either end of the cut out 46. A triangular barb 50 is provided on either side of the minor axis of the terminal 36 along the edge furthest from the commutator segment 34.

As can be seen from FIG. 3, the commutator segment 34 is of arcuate form which conforms to the external radius of the cylindrical base 10. The lug 42 extends below and back along the length of the commutator segment 34 with the tag 44 projecting below the lug 42. Terminal 36 is bent upright from the commutator segment 34 and the arms 52 of the terminal 36, which include the respective key hole formations 48, are bent as 90 degrees to the central portion 54 of the terminal. The arms 52 therefore extend parallel to each other and to the longitudinal axis of the commutator segment 44, and forward along the length thereof. The free ends 56 of the terminal 36 are bent so as to be inclined towards each other when the arms 52 have been bent parallel to each other.

Figure 4:
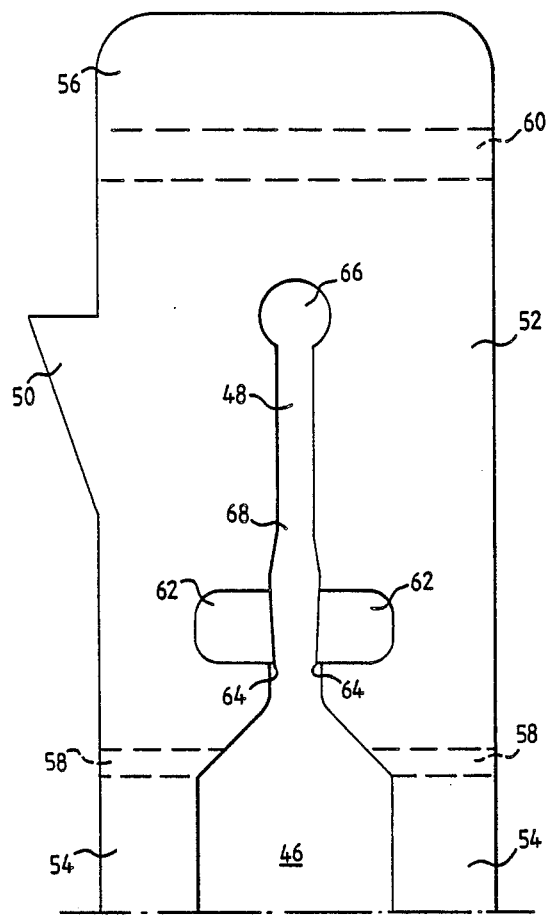
FIG. 4 is an enlarged view of one portion of the terminal shown in FIG. 2.

FIG. 4 shows one half of the terminal 46 of FIG. 2, on an enlarged scale. Areas 58 are shown in which bending occurs between the central portion 54 and the arm 52. Area 60 is also indicated in which bending between the arm 52 and the extreme end portion 56 occurs. However, the main purpose of FIG. 4 is to illustrate the detailed structure of the key hole cut out section 48. It is this feature which ensures contact with the armature winding portion 32. The reduction in size from the centre of the cut portion 46 to the start of the key hole portion 48 provides a funnel for guiding the arm 52 onto the winding portion 32. A short distance into the key hole portion 48 there are located two cutters 62 which have sharp edges 64 projecting into the cut out 48. Preferably, the cutters 62 are formed by a precise stamping operation. Alternatively, and as shown, the cutters 62 are formed from the arm 52 but are partially severed therefrom such that the sharp edges 64 are resiliently urged into the cut out 48. Along the cut out 48, behind the cutters 62, there is a further small reduction in width. Circular end 66 of cut out 48 ensures that the edges of the cut out 48 have a certain resilience to separation by the winding portion 32.

FIG. 5 shows an assembled commutator in which shaped commutator segments 34 and the terminals 36 are in position on the base 10. The terminals 36 are located between a pair of adjacent ears 38. The front end of the base 10 is provided with three longitudinal recesses 70 which are cut away at the forward ends so as to meet the curved external surface of the base 10. Lug 42 of commutator segment 34 is received in the recess 70 and tag 44 of lug 42 is forced into the material of the base 10 so as to rigidly restrain the lug 42 within recess 70.

FIG. 6 shows the assembled commutator of FIG. 5 connected to the support of FIG. 1. Each terminal 36 enters a respective housing 18 and the central portion 54 of the terminal 36 passes over the boss 28. The winding portion 32 is guided into the key hole cut out 48. As the terminal 36 passes over the wire 32 the sharp edges 64 of the cutters 62 sever the insulation on the wire 32 and further entry of the terminal 36 forces the wire 32 into the narrow portion 68 of cut out 48.

The slight resilience provided by circular portion 66 and the relative sizes of the wire and the section 68 ensure that the arms 52 continue to bear against the wire 32 with a residual spring tension which maintains high contact pressure ensuring a reliable long term connection.

The barbs 50 grip the cover 25 of the housing 18 and therefore retain the terminal 36 within the housing 18. Additional retention may be provided by contact between the central portion 54 of the terminal 36 and the boss 28. The arms 52 of the terminal 36 can be bent at an angle slightly less than 90 degrees from the central portion 54 so as to provide retention of the terminal 36 by action against the side wall 20 of the housing 18. Further retention is provided if the width of the terminal 36 is a close fit to the internal dimensions of the housing 18.

The armature may be assembled as follows:

The body 12 is first placed on the armature shaft with the spacer 16 against the base of the lamination stack. The lead wire of the armature winding is inserted into the housing 18 by laying the end of the wire 32 in the slots 30 provided in the side wall 20 of the housing 18.

The wire 32 is drawn back into the housing 18 until it rests against the boss 28. From this start, the first armature coil is wound. At the end of the first coil winding the armature is indexed and the wire 32 is layed in the same manner in the next housing 18 without breaking the continuity of the wire 32.

This process is repeated until all coils have been wound and the tail end of the winding is then laid in the slots 30 of the first housing 18 and pushed back until it is adjacent to the lead end which was placed against the boss 28 at the beginning of the winding operation. The wire 32 is then cut and the armature removed from the winding machine.

The body 12 now has a winding portion 32 comprising insulated wire (e.g. enamel coated wire) laying in each of the housings 18. Each of the winding portions 32 is under tension and is pulled tight against the respective boss 28.

The communicator segments 34 are pre-assembled on the base 10. To do this they are placed on the outer surface of the base 10 and are slid along the base 10 so that the terminals 36 slide between a pair of adjacent ears 38 and the lugs 42 enter the respective recesses 70. The segments 34 may be held on the base 10 by a ring (not shown) which can be snipped off after connecting the terminals 36 to the body 12.

The base 10 together with commutator segments 36 is slid along the armature shaft and as the terminals 36 approach the winding portions 32 held in the housings 18, the slots provided by cut outs 48 move over the wires 32. THE sharp edges 64 of the cutters 62 sever the insulation on the wires 32 which is deformed as the slots, formed by cut outs 48, move over the wires 32. Intimate metal to metal contact is thereby provided between the wires 32 and the terminals 36.

The armature described above possesses the advantages of the armature described in our British Pat. No. 2128818B and has the additional advantage that the base 10 and the body 12 are formed separately and may each be of a material compatible with the function which it has to perform. Thus, the thermoplastics body 10 which will flex during insertion of the terminals 36 may be used whilst the base 10 will withstand higher temperatures.

Alternatively, the body 10 may be of rigid material such as a phenolic resin. In this instance the segment 34, 36 is formed of material which will flex or give (this will depend in part on the shape of the terminal portion 36 and the cutouts 46, 48) as it is urged into the housing.

The above embodiment is given by way of example only and various modifications will be apparent to a person skilled in the art without departing from the scope of the invention. For example, the commutator could be in the form of a face plate commutator as described in our co-pending British Patent Application No. 8629625. The commutator segments could be designed in a manner similar to that described in our co-pending British Patent Application No. 8629624 so that the connections between the armature winding and the commutator can be made during winding of the armature.

This invention is particularly but not exclusively applicable to armatures of fractional horsepower electric motors.

What is claimed is:

1. A method of assembling an armature of an electric motor comprising the steps of:
   providing an armature core;
   providing a commutator unit having commutator segments thereon, said commutator segments each including a respective commutator segment terminal;
   providing a terminal support separate from said commutator unit and having housings for said terminals;
   disposing said armature core and said terminal support coaxially;
   winding an armature winding on said core and winding connector portions of said winding through said housings;
   disposing said commutator unit coaxially with said armature core and terminal support; and
   bodily moving the commutator unit relative to the terminal support thereby inserting simultaneously each said terminal into a respective housing and effecting direct electrical contact and mechanical engagement between each said commutator segment terminal and a respective one of said connector portions.

2. The method of claim 1 further comprising providing in said terminals respective slots extending generally parallel to the commutator axis, said contact between said terminals and said connector portions being effected by said slots straddling and gripping said connector portions.

3. The method of claim 2 comprising winding said armature winding with insulated wire and displacing the insulation of said connector portions by said slots.

4. The method of claim 1 comprising performing said winding step with said commutator unit and terminals absent, and thereafter effecting relative movement of the commutator unit with said terminals on the one hand and the armature windings and terminal support on the other hand whereby said slots of said terminals are brought into straddling and gripping engagement with said connector portions.

* * * * *